Jan. 25, 1955 R. L. MURRAY ET AL Re. 23,930

HIGH-VOLTAGE FUSE

Original Filed July 10, 1951

INVENTORS
ROYCE L. MURRAY
WILLIAM H. McCLURE
EDGAR W. GARRISON, JR.

BY Strauch, Nolan & Diggins
ATTORNEYS

United States Patent Office

Re. 23,930
Reissued Jan. 25, 1955

23,930

HIGH-VOLTAGE FUSE

Royce L. Murray, William H. McClure, and Edgar W. Garrison, Jr., Birmingham, Ala., assignors to USCO Power Equipment Corp., Birmingham, Ala., a corporation of Alabama Original No. 2,660,644, dated November 24, 1953, Serial No. 235,996, July 10, 1951. Application for reissue September 10, 1954, Serial No. 455,373

3 Claims. (Cl. 200—131)

Matter enclosed in heavy brackets [ ] appears in the original patent but forms no part of this reissue specification; matter printed in italics indicates the additions made by reissue.

This invention relates to electrical fuse devices for use in high voltage power distribution systems, and more particularly to improvements in tubular power fuses in which a fuse link is formed of a small diameter fusible conductive element which joins relatively larger conductors electrically connected to spaced fuse end terminals, and extends coaxially through an insulator tube or sleeve mounted between the end terminals as a protective casing. The drop out fuse device disclosed in United States Patent No. 2,365,113, issued December 12, 1944, to W. O. Schultz is one form of such prior art device while another form of such a fuse device is that shown in United States Letters Patent No. 2,485,221, issued October 18, 1949, to F. H. Turnham et al.

In such fuse devices, much difficulty has been encountered in the past as a result of disintegration of the fuse link *and the arc extinguishing gas producing liner* caused by the corona effect produced around the small diameter wire in high voltage installations. This difficulty results from the fact that the corona produced around the fusible wire acts on the constituents of the surrounding air in the tubular insulator to break down the oxygen to form ozone ($O_3$), a portion of which then chemically combines with the nitrogen component and water vapor to form nitrous acid. The nitrous acid thus formed collects on the fusible wire *and the liner* and produces corrosion or an "eating away" of the small fusible wire *and liner*. Since the diameter of the fusible wire is a function of the maximum current carrying capacity for which the fuse is designed, resort cannot be made to the obvious procedure of enlarging the diameter of the conductor to compensate for or eliminate the corona effect.

Since this corrosion of the fusible wire *and disintegration of the liner* results *respectively* in a reduced current carrying capacity or current rating of the fusible element *and excessive burning of the liner upon fusing of the fuse link* it has been found necessary in practice to frequently inspect high voltage fuse installations and replace the fuse links of such fuse devices at from three to six month intervals *and to replace the tubes themselves when disintegration of the liner has progressed sufficiently* regardless of whether the current load has exceeded the current rating of the fuse. Since the fuse link of fuse devices of this type heretofore provided must be frequently replaced, much inconvenience and a high cost of maintenance of the power distribution system results. This has limited the fields of application of these otherwise highly satisfactory and relatively inexpensive fuse devices.

To avoid possible ambiguity and to more clearly state the object and purpose of this invention, the meaning of the word "corona," as known and used by those familiar with the art of electric power generation and transmission, is the electric overstressing or ionization of the layer of air in contact with a conductor.

Further, since the object and purpose of this disclosure is to control and prevent corona formation and its consequent damage to [an] essential [element] *elements* of electric high-voltage fuses, we will point out the principal physical law which governs the formation of corona. Since the electric gradient in air surrounding an electrified conductor increases as the distance from the conductor is decreased in much the same relation as light intensity increases as the distance to the source is decreased, it follows that for a given conductor radius there is a voltage level above which the surrounding air cannot withstand the voltage stress and the conductor is enveloped in a layer of minute radially extending sparks or electrically punctured air, tending to build or extend the conducting surface to a radius large enough that the air boundary will withstand the electric stress.

As is well known, the melting point of a fusible wire is fixed by the wire size, and for practical ratings the wire size is small compared to the size necessary to be above the critical size for corona-free operation on high voltage, the principle[s] of which was described above.

With the above principles and facts in mind, this disclosure describes ways and means to surround the fuse wire which is excessively small with regard to being corona-free with a sufficiently conducting surface of corona-free radius operating at near the same voltage as the fuse wire, at the same time being of sufficiently high resistance to not in any way impair the operating functions of the fuse structure.

The prime purpose of this invention is to effectively enlarge the radius of the corona forming element without enlarging the fusible element and without adversely affecting the function and operation of the fuse.

Since the current required at commercial frequency to charge the surface of a conductor in space is a small value compared to the current rating of the fuse, it becomes feasible to provide a concentric electrified surface over the fuse and having a radius sufficiently large to be free of corona at the rated voltage at the same time being in the form of a high resistance end to end so as not to interfere with the current interrupting properties of the assembly and subsequent insulating period after the fuse operates.

It is, accordingly, a primary object of this invention to provide a relatively inexpensive tubular power fuse of an improved construction which assures long life of the fuse link *and gas producing liner* even when utilized for high voltage installations and avoids the necessity of frequent inspection and replacement of the fuse link thereof.

It is a further object of this invention to provide a relatively inexpensive high voltage fuse of an improved construction in which the corrosion resulting from the corona effect heretofore produced around the small fusible element is substantially eliminated.

More specifically it is an object of this invention to provide a tubular fuse comprising a fuse link shielded by a resistor element of high resistance value connected electrically in parallel therewith so that the corona heretofore developed around the fusible element thereof is substantially eliminated.

A further object of this invention is to provide a tube or sleeve for a tubular fuse assembly which is of an improved construction adapted to substantially eliminate the corona effect heretofore produced around the fusible element thereby obviating the corrosion normally encountered in use of such fuses on high voltage lines.

A further specific object of this invention is to provide an insulating tube or sleeve adapted to extend between [space] *spaced* end terminals of a fuse device in surrounding relation with the fuse link thereof with an integral cylindrical resistor of high resistance value coextensive in length therewith.

More specifically, it is an object of this invention to provide a fuse link tube having a resistive coating coextensive in length with the tube formed intermediate two of the layers of insulating material thereof and electrically connected to the terminal ferrules used to connect the fuse in the line.

These and other objects of this invention will become apparent from the detailed description and appended claims when read with reference to the accompanying drawing wherein:

Figure 1:
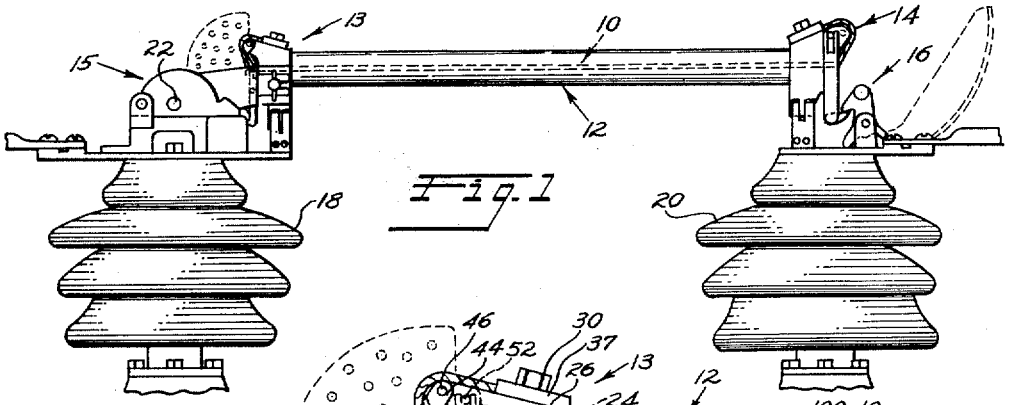
Figure 1 is an elevational view of one form of a single tube fuse assembly, to which the present invention is particularly applicable.

The illustrated form of fuse device, shown in its closed position in Figure 1 of the drawing, comprises a fuse link 10 surrounded by a tube or sleeve 12 electrically and mechanically connected through terminal ferrules 13 and 14 to spaced terminal assemblies 15 and 16. Terminal assemblies 15 and 16 are conventionally mounted upon suitable ceramic insulators 18 and 20. The fuse assembly disclosed is of the double latching type and is adapted to be automatically disconnected from the line upon occurrence of an overload through mechanical separation of the fuse link 10 and resulting unlatching of the fuse link tube 12, the tube and elements fixed thereto pivoting in a counterclockwise direction about the axis of pivot shaft 22 of end terminal assembly 14 to its open position. This effects a complete electrical disconnection between the end terminal assemblies.

Figure 2:
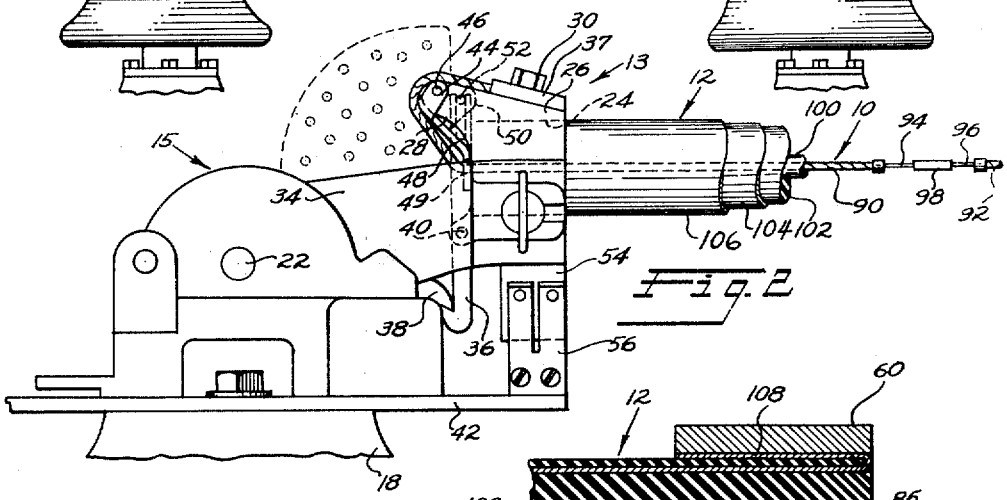
Figure 2 is an enlarged view of the hinge and terminal assembly at one end of the fuse device of Figure 1 which may serve as the hinge end of a modified form of fuse such as shown in the aforementioned Turnham et al. patent.

The structure of end terminal assembly and associated terminal ferrule 13 is shown in Figure 2 in detail and is quite similar to that disclosed and described in detail in the above mentioned United States Letters Patent No. 2,485,221. The end of the fuse link tube 12 is mounted in aperture 24 formed in a hinge casting 26 and is secured thereto by suitable means not shown. The corresponding end of the fuse link 10 extends from the end of tube 12 around an arm 28 formed integral with the casting 26 and is secured in electrical contact with the casting 26 by a suitable machine screw 30 and plate 32. The casting 26 is secured to a support or hinge arm 34 which is pivotally mounted on the shaft 22 and which is spring biased in a counterclockwise direction about the shaft 22 by a suitable torsion spring not shown. The arm 34 is normally held in the position shown in Figures 1 and 2 against the force exerted by the torsion spring by the engagement of a pair of coacting latch members 36 and 38, the former being pivotally mounted at 40 upon the casting 26 and the latter being pivotally mounted upon the base plate 42 of the end terminal assembly 15. A member 44, known as a fuse link ejector, is pivotally mounted upon the casting extension or ear 28 at 46, a torsion spring (not shown) being provided to normally bias ejector 44 in a clockwise direction about the pivot 46 from the position shown. Ejector 44 is formed with an arm 48 having a bifurcated end providing an aperture 49 through which the fuse link 10 extends and at one side with an ear 50 having a pin 52 fixed thereon and engaged in the slot of the bifurcated upper end of latch member 36.

Ejector 44 is held in the position shown by the fuse link 12 against the force exerted by the torsion spring so long as fuse link 12 remains tight between the end terminals. Upon occurrence of an overload causing the ends of the fuse link to separate, the ejector 44 will be released to pivot in a clockwise direction about the pivot 46 under the action of the torsion spring to eject the end of the fuse link 10 from the fuse link sleeve 12. Release of ejector 44 through the engagement of pin 52 in the slot of the bifurcated end of the latch member 36 causes the latch member 36 to pivot in a counterclockwise direction about the pivot 40 upon disengagement of latch 36 from the latch 38, the arm 34, the casting 26 and the fuse link tube 12 pivot in a counterclockwise direction under the force of the torsion spring about the shaft 22. A shock absorbing mechanism such as shown in Patent No. 2,485,221 is preferably provided to arrest movement of this assembly at the end of its stroke.

Coacting contact members 54 and 56, which are secured respectively to the casting 26 and the base 42, establish an electrical connection from the base plate 42 to the casting 26 and end of the fuse link 10 which is secured thereto so long as the assembly is in its latched position. If further explanation in mechanical arrangement of this end terminal assembly 14 is found to be necessary for a complete understanding of the present invention, reference is made to the aforesaid Turnham et al. patent.

Figure 3:
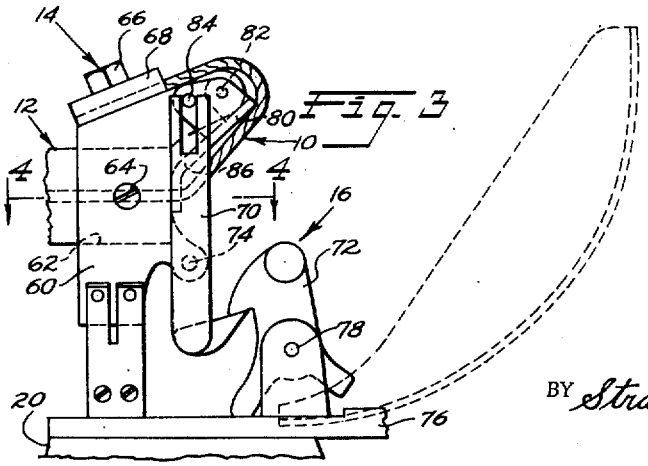
Figure 3 is an enlarged view of the latching end terminal assembly at the opposite end of the fuse device of Figure 1.

The end terminal assembly 16 and associated terminal ferrule 14, which is also of a releasable latch construction, is shown in an enlarged view in Figure 3. An end casting 60 having an aperture 62 through which the sleeve 12 extends is secured thereto by a set screw 64. The associated end of the fuse link 10 extends from the end of tube 12 and is electrically connected to the casting 60 by the screw and plate 66 and 68 respectively.

The fuse tube is latched in the position shown in Figure 1 by the coaction of latches 70 and 72, the former being pivotally mounted upon the casting 60 at 74 and the latter being pivotally mounted upon the terminal base plate 76 at 78.

Release of latch 70 from latch 72 is effected upon fusion of fuse link 10 simultaneously with the disengagement of the latches of the opposite end terminal assembly by a similar release linkage. An ejector 80, which is spring biased in a [counterlockwise] *counterclockwise* direction about its pivot 82 on casting 60, is held in the position shown by fuse link 10 which passes through its [opertured] *apertured* lower end. Upon severance of the fuse link 10, the spring urged counterclockwise movement of ejector 80 produces clockwise movement of latch member 70 to its disengaged position through the coaction of pin 84, fixed to ejector 80, with the slot of the bifurcated upper end of latch member 70.

In this fuse assembly structure severance of the fuse link upon the occurrence of an overload will simultaneously effect the release of the latches of both end terminal assemblies to permit counterclockwise movement of the fuse tube 12 and the associated elements thereon about shaft 22 to its open position. As is best illustrated in Figure 2, the fuse link 10 comprises two pieces of flexible copper conductor 90 and 92 to the adjacent ends of which are soldered two smaller conductors 94 and 96 respectively. The adjacent ends of conductors 94 and 96 are in turn soldered together by the joint 98. This is a well known type of fuse link which when heated by a moderate overload severs first either at the joint 98 or at one or both of the small conductors 94 and 96. The fusion of these elements of course opens the circuit between the end terminal assemblies 14 and 16 and releases the latches 36 and 70. It is with reference to the corona produced around the small conductors 94 and 96 that the present invention is particularly directed.

We have found that, by the provision of what is in effect a tubular resistor of high resistance value which surrounds the small fusible wires 94 and 96 of the fuse link and which is connected at its opposite ends electrically to the end terminals so that it is electrically in parallel with the fuse link, the corona heretofore present around the fusible element and the undesirable results therefrom, previously pointed out, can be substantially eliminated.

Figure 4:
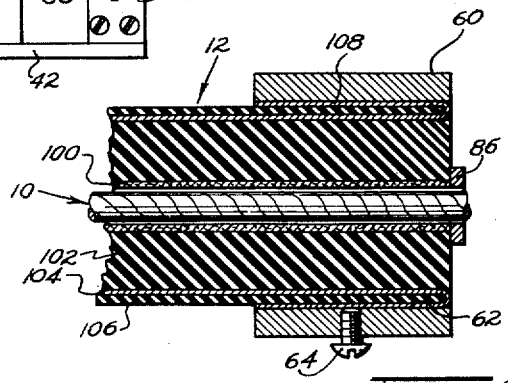
Figure 4 is a sectional view of the sleeve or tube surrounding the fuse link taken substantially along the line 4—4 of Figure 3.

The improved fuse link tube structure, which is best shown in Figures 2 and 4, preferably includes an internal cylindrical fiber *or other suitable gas producing* liner 100 extending between the end terminals and through which the fuse link 10 passes and a relatively thick cylindrical body 102 of Bakelite or other suitable insulating material formed in surrounding relation to and coextensive in length with the fiber liner 100. Such a tubular fuse according to this invention is then provided with layer 104 of electrically resistive material having a high value of resistivity applied to the entire exterior surface of body 102 and an external cylinder layer 106 of Bakelite or other suitable insulating material surrounds the layer 104 to provide a protective insulating wrapper therefor.

As is shown in Figure 4, the fuse tube extends into the cylindrical aperture 62 of contact casting 60. Electrical contact between casting 60 and the resistive layer 104 may be established in any suitable manner and in the illustrated form is established by the provisions of an extension of the resistive layer 104 over the exterior surface of the end of the wrapper 106 as indicated at 108. The opposite end of fuse tube 12 is mounted in casting 26 and electrical connection between casting 26 and resistive layer 104 is established in the same manner.

Since both the fuse link 10 and the cylindrical resistive layer 104 are electrically connected to both terminal castings 26 and 60, resistive layer 104 constitutes a cylindrical resistor of high resistance value electrically in parallel with and surrounding the fuse link 10.

Resistive layer 104 may be formed of any suitable resistive material. Among those found satisfactory are a coating of finely ground carbon in varnish of suitable thickness, or a layer of resistor paint such as those described in National Bureau of Standards Circular No. 468, entitled "Printed Circuit Techniques," at pages 7 to 9. A cylindrical resistor formed of a layer of resistive tape wrapped around the insulating tubular body 102 has been also found to be satisfactory in practice.

The value of resistance of the layer 104 between the end terminals must of necessity be a compromise between two design considerations: 1. After fuse operation there is a voltage impressed end to end; this must not cause overheating of the resistor or the insulating elements. If such overheating does occur, the normal circuit interrupting properties may be interfered with. 2. During normal operation, the resistor coating must carry the surface charging current; the IR drop due to this current must not exceed the critical corona voltage between the link and the tube.

As a specific example of a practical form of the present invention, a fuse having a rating of 110,000 volts should have a resistance value of the layer 104 between the ends of the fuse of the order of 470 megohms. A fuse of such rating may be provided with a tubular housing having an outside diameter of two and one-quarter inches, and inside diameter of ⅜ of an inch, and an overall length of 46 inches. For such a fuse, it has been found that the potential difference between the fuse link and the adjacent outer surface of the tubular housing is reduced by the presence of the resistive layer 104 to approximately one-fifth of the potential difference for a tubular housing of the same dimensions without the resistive layer. This reduction of potential substantially eliminates the corona heretofore present around the fusible elements of the fuse link. The elimination or substantial reduction of the corona by the tubular housing of the present invention has extended the life of the fuse links to at least from 4 to 6 times the period of from 3 to 6 months heretofore existing *and extends the life of the gas producing liner indefinitely in the absence of destruction due to burning upon normal fuse operation.*

The fuse construction of the present invention, therefore eliminates the high service costs heretofore necessary in air break fuses and adapts such air break fuses for use in lieu of the relatively expensive oil circuit breakers, chemical or liquid type fuses in many situations where frequent servicing would be impractical because of either high costs or [undesriable] *undesirable* service interruptions.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A high voltage corona inhibiting expulsion type air break [dropout] fuse tube adapted to operate in a line at a voltage high enough to make corona a problem comprising an insulating tube body having an axial bore therethrough extending from end to end; a sleeve-like conducting terminal at each end of said tube adapting said tube ends for electrical connection to a pair of spaced line terminals; a [fibre] sleeve closely fitting said axial bore and adapted upon fuse operation to emit arc extinguishing gases; a replaceable fusible link extending through said [fibre] sleeve and having a small fusible element interposed between relatively large flexible end terminal connected conductors adapted to be connected to said spaced line terminals to provide a normal current carrying connection therebetween; a resistor layer of high electrical resistivity surrounding said tube body and extending into said sleeve-like conducting terminals to electrically connect said sleeve-like terminals for reducing the potential difference between the fusible link and the exterior surface of said insulating tube to a degree sufficient to substantially prevent corona troubles along the surface of said fusible link within said insulating tube body; and an outer layer of suitable insulating material surrounding said resistive layer between said sleeve-like tube terminals adapted to protect said resistive layer from exposure to the deleterious effects of the surrounding atmosphere.

2. A fuse tube structure according to claim 1 wherein said resistive layer comprises a resistive tape wrapped around said insulating tube body.

3. A fuse tube structure according to claim 1 wherein the voltage resistance relationship between the fuse element and the end to end resistance of the resistive coating is proportional to the ratio of 110,000 volts to 470 megohms.

References Cited in the file of this patent or the original patent

UNITED STATES PATENTS

| | | |
|---|---|---|
| 1,631,851 | Bennett | June 7, 1927 |
| 1,730,716 | Austin | Oct. 8, 1929 |
| 1,821,761 | Lemmon | Sept. 1, 1931 |
| 2,322,702 | Peterson | June 22, 1943 |
| 2,365,113 | Schultz | Dec. 12, 1944 |
| 2,660,644 | Murray et al. | Nov. 24, 1953 |